United States Patent [19]

Ochiai

[11] Patent Number: 4,844,544
[45] Date of Patent: Jul. 4, 1989

[54] FORE-AND-AFT ADJUSTING DEVICE FOR HEAD REST

[75] Inventor: Susumu Ochiai, Akishima, Japan

[73] Assignee: Tachi-S Co., Ltd., Tokyo, Japan

[21] Appl. No.: 209,484

[22] Filed: Jun. 20, 1988

[30] Foreign Application Priority Data

Jun. 30, 1987 [JP] Japan .................. 62-100647

[51] Int. Cl.⁴ .................. A47C 1/10; B61G 51/00
[52] U.S. Cl. .................. 297/408; 297/216; 297/391
[58] Field of Search .............. 297/408, 216, 284, 391

[56] References Cited

U.S. PATENT DOCUMENTS 4,606,578  8/1986  Yasui .................. 297/408

FOREIGN PATENT DOCUMENTS 2927702  1/1981  Fed. Rep. of Germany ...... 297/408
2945060  5/1981  Fed. Rep. of Germany ...... 297/408
3407776  9/1985  Fed. Rep. of Germany ...... 297/408

Primary Examiner—James T. McCall
Attorney, Agent, or Firm—Browdy and Neimark

[57] ABSTRACT

A fore-and-aft adjusting device for head rest used in an automotive seat, which is adapted for adjusting the position of the head rest in the forward and backward direction relative to the seat. In the device, provided is a friction member for that adjustment purpose, which is embracingly supported by a rigid embracing support member of substantially U shape in section, the embracing support member being integrally provided on the head rest frame. The friction member is therefore prevented against deformation by virtue of such embracing support member.

14 Claims, 2 Drawing Sheets

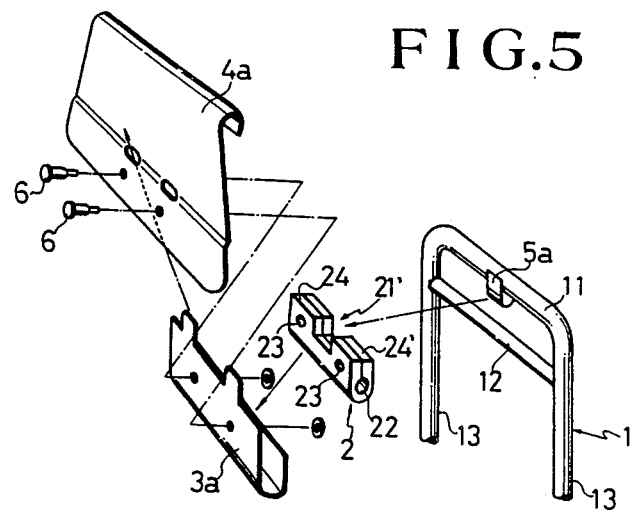
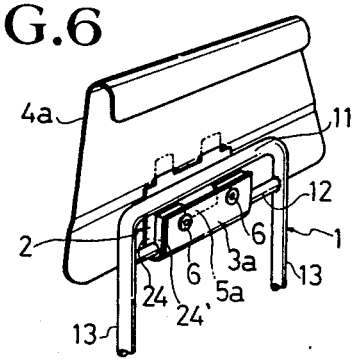
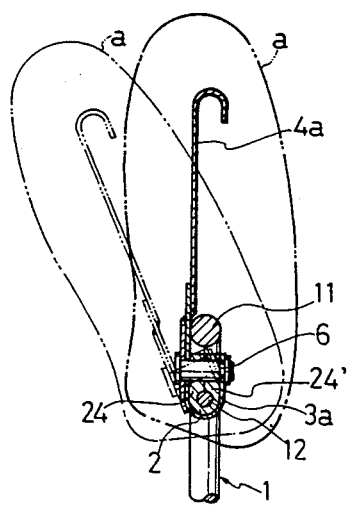
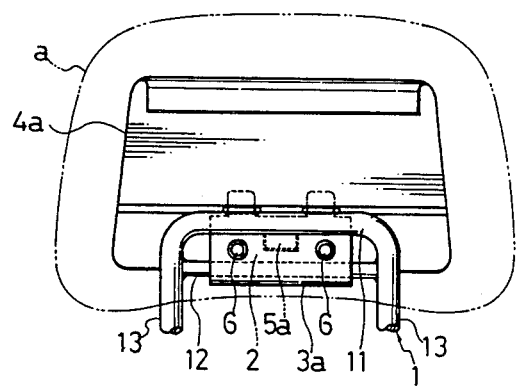

FORE-AND-AFT ADJUSTING DEVICE FOR HEAD REST

BACKGROUND OF THE INVENTION

1. Field of the Invention

The present invention relates to a fore-and-aft adjusting device for a head rest used in an automotive seat, which is adapted for adjusting the positions of the head rest forwardly and backwardly relative to the seat, using a friction means.

2. Description of the Prior Art

The hitherto conventional fore-and-aft adjusting devices of this kind for a head rest using a friction means included either a metallic friction means such as a plate spring (as known from the Japanese Utility Model Publication No. 60-36111) or a synthetic resin friction means, for instance.

Those prior art devices have attendent respective drawbacks and disadvantages. In the former device, the metallic friction means is in contact with the head rest frame in a small contact area, resulting in insufficient friction effects, whereas in the latter one, although having a sufficient contact area between the friction means and head rest frame and thus being free from this drawback, the synthetic resin nature of the friction means creates the possibility of its deformation due to frictional heat between the frame and friction means, which gives an undesired variation to its friction effect.

SUMMARY OF THE INVENTION

In view of the above-mentioned drawbacks of the prior art, it is therefore a purpose of the present invention to provide a fore-and-aft adjusting device for a head rest which attains a sufficient and constantly stable frictional relation between its friction means and head rest frame.

To accomplish such a purpose, according to the present invention, a synthetic resin material is employed having a large contact area to contact a head rest stay as a friction member, and further is provide a rigid embracing support member made of a metallic plate or the like which embracingly supports the friction member. The embracing support member is integrally provided on a head rest frame. The head rest stay embraced by the embracing support member is formed with a stopper for limiting the fore-and-aft adjustment range of the head rest frame relative to the stay. This stopper serves to prevent the lateral movement of the head rest body relative to the stay as well.

BRIEF DESCRIPTION OF THE DRAWINGS

FIG. 5 is an exploded perspective view of a second embodiment of the present invention;

FIG. 6 is a perspective view of the second embodiment, showing its assembled state;

FIG. 7 is a side view of the same second embodiment as in the FIG. 6; and

FIG. 8 is a rear view of the same second embodiment as in the FIG. 7.

DETAILED DESCRIPTION OF PREFERRED EMBODIMENTS OF THE INVENTION

Figure 1:
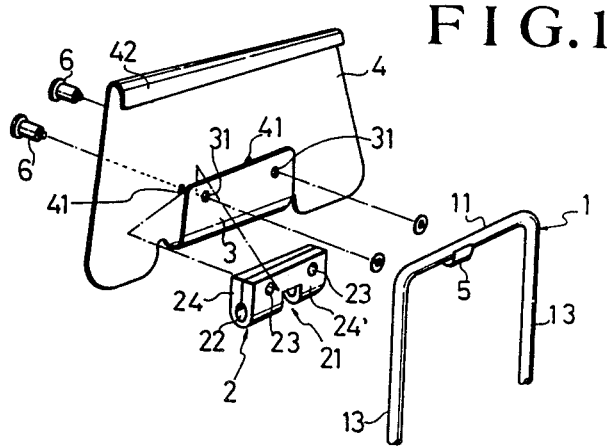
FIG. 1 is an exploded perspective view of a first embodiment of the present invention.

Referring to FIGS. 1 through 4, there is illustrated a first embodiment of the present invention.

In the drawings, reference numeral (1) denotes a head rest stay made of a tubular material or a cylindrical rod. The head rest stay (1) comprises a horizontal portion (11) and a pair of vertical leg portions (13) integrally formed at both ends of the horizontal portion (11), extending downwardly therefrom. As shown, a stopper (5) is integrally fixed on the horizontal portion (11) of the head rest stay (1), and, via a friction member (2), rotatably supported on that horizontal portion (11) is a head rest frame (4) in the form of a rigid plate. The head rest frame supported such that the head rest frame (4) is rotatable about the horizontal portion (11) in forward and backward directions with respect to the stay (1).

The friction member (2) is made of such synthetic resin material as nylon or polyacetal and is formed by bending a base material in folio to thereby comprise juxtaposed end portions (24)(24') directed upwardly when placed on the horizontal portion (11), a through bore (22), and a cut-away portion (21). The entire length of the friction member (2) is somewhat shorter than that of the horizontal portion (11) of the head rest stay (1).

Figure 2:
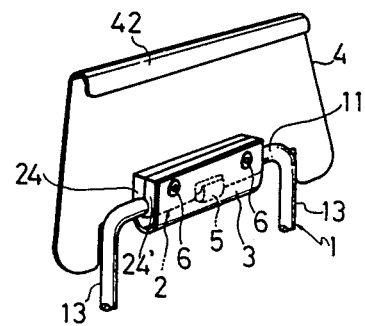
FIG. 2 is a perspective view of the first embodiment, showing its assembled state.

The through bore (22) of the friction member (2), as best shown in FIG. 2, receives the horizontal portion (11) of the stay (1) therewithin, with the inner diameter of the through bore (22) being somewhat smaller than the other diameter of the horizontal portion (11) so as to produce friction against the head rest stay (1). The stopper (5) on the horizontal portion (11) extends through the cut-away portion (21) of the friction member (2) outwardly.

Numerals (23)(23) denote two securing holes perforated in the friction member (2), which are intended for securing the friction member (2) to the head rest frame (4) at an embracing support member (3) to be described below.

In the illustrated embodiment, the embracing support member (3) is of a substantially U-shaped configuration in section, which is formed by curving its lower part in an upward direction so as to embrace and support the friction member (2) therein. Numerals (31)(31) denote two securing openings perforated in the embracing support member (3), through which openings are respectively inserted two securing member (6)(6).

The head rest frame (4) is made of a metallic plate, and is so formed that a recessed groove (not shown) is defined in the longitudinal direction thereof and a bent portion (42) is defined at the upper end portion thereof, the bent portion (42) being bent in a direction rearwardly of the head rest frame (4) for the purpose of reinforcing the rigidity of the frame (4) per se. In the drawings, designations (41)(41) stand for two openings through which the securing members (6)(6) are inserted respectively.

FIG. 2 shows the state wherein the above-mentioned component parts are assembled together to provide a head rest in accordance with the present first embodiment. As shown, the horizontal portion (11) of the head rest stay (1) is held by the friction member (2) which is embraced and supported by the embracing support member (3), with the juxtaposed end portions (24)(24')

of the friction member (2) being directed upwardly. Those elements are fixedly secured to the rear side of the head rest frame (4) by means of the securing members (6)(6) which preferably comprise bolts and nuts being inserted through the foregoing securing openings and holes (23, 31, and 41).

Figure 3:
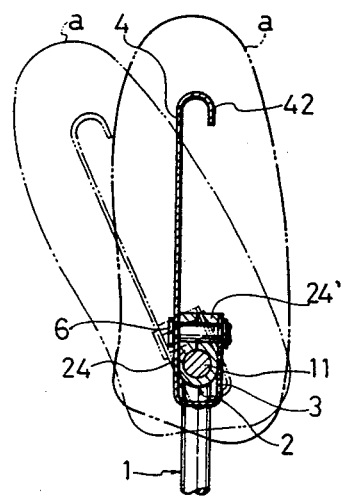
FIG. 3 is a side view of the same first embodiment as in the FIG. 2.

Accordingly, as illustrated in FIG. 3, it is seen that when the head rest (a) is inclined forwardly or backwardly against the frictional resistance of the friction member (2), the head rest (a) is rotated about the horizontal portion (11) of the head rest stay (1) forwardly or backwardly, so that the position of the head rest (a) can be adjusted. Such forward and backward rotation of the head rest (a) is limited by the reason of the surface of the cutaway protion (21) being brought to abut against the stopper (5) in either of the forward and backward rotations of the head rest (a), whereby the head rest (a) is limited at a certain degree in its fore-and-aft rotation range.

Figure 4:
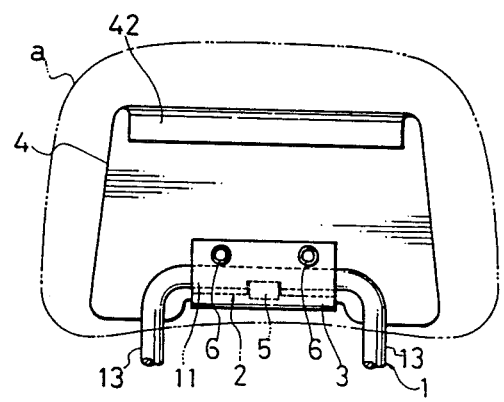
FIG. 4 is a rear view of the same first embodiment as in the FIG. 2.

FIG. 4 shows the rear side of the present embodiment.

With reference to FIGS. 5 through 8, there is illustrated a second embodiment of the present invention. In this embodiment, a reinforcing rod (12) extends between the upper portions respectively of a pair of the vertical leg portions (13) of a head rest stay (1) in parallel with the horizontal portion (11) thereof. A friction member (2) is mounted on the reinforcing rod (12) which is supported embracingly by an embracing support member (3a). This embracing support member (3a) is an independent member formed independently of a head rest frame (4a).

Since most of the parts and elements in the present embodiment are identical to those of the above-mentioned first embodiment, all like reference numerals and designations refer to like parts and elements. Hence, a specific description is omitted regarding those identical parts and elements.

The reinforcing rod (12) is at its both ends welded to the upper portions of the vertical leg portions (13) of the stay (1), respectively. On the horizontal portion (11) of the stay (1), a stopper (5a) is fixed such that it is oriented downwardly (i.e. towards the reinforcing rod (12)).

The friction member (2) is similar in structure to that of the foregoing first embodiment, having a cut-away portion (21') formed therein at a point corresponding to that of the stopper (5a). As shown, the friction member (2) is mounted on the reinforcing rod (12) of the head rest stay (1) such that the juxtaposed end portions (24)(24') of the friction member (2) is directed upwardly.

The embracing support member (3a), as illustrated, is formed independently of the head rest frame (4a) such as to embrace therein the friction member (2), and fixedly secured by means of securing members (6)(6) to the head rest frame (4a). As understable from the drawings, the upper end portion of the embracing support member (3a) is superposed on and secured to the rear surface of the head rest frame (4a), and therefore, the rigidity of the frame (4a) is strengthened.

FIG. 6 shows the state wherein the above-mentioned friction member (2), embracing support member (3a) and head rest frame (4a) are secured to the reinforcing rod (12) of the head rest stay (1) by means of the securing members (6)(6). As can be seen, the head rest frame (4a) is disposed forwardly of the horizontal portion (11) of the head rest stay (1), whereupon the horizontal portion (11) serves to limit the backward rotation of the head rest (4a) relative to the stay (1).

Accordingly, as illustrated in FIG. 7, it is seen that when the head rest (a) is rotated forwardly about the reinforcing rod (12) against the friction resistance of the friction member (2), it is then possible that the position of the head rest (a) can be adjusted in the forward and backward direction relative to the head rest stay (1). In this connection, the forward rotation of the head rest (a) is limited by the stopper (5a) by the reason that when the head rest (a) is rotated forwardly to an extreme degree, the surface of the cut-away portion (21') is brought to abutment against the stopper (5a).

FIG. 8 shows the rear side of the present embodiment.

From the above descriptions, it is appreciated that, in accordance with the present invention, the substantially U-shaped friction member of synthetic resin material is mounted around the horizontal portion of ⊓-shaped head rest stay, and as such, the friction member contacts the horizontal portion of the stay generally in the entire length of the latter, which increases the contact area of the friction member against the head rest stay. Further the provision of the stopper on the horizontal portion of the stay as well as the formation of the cut-away portion in the friction member serve not merely to limit the fore-and-aft rotation range of the head rest, but to prevent the lateral movement of the head rest relative to the stay.

In particular, in accordance with the present invention, the friction member is embraced and supported by the rigid embracing support member secured on the head rest frame. This avoids the deformation of the friction member caused by a frictional heat during a long repeated use thereof, and thus, maintains the constant friction effect of the friction member against the head reast stay.

What is claimed is:

1. A fore-and-aft adjusting device for a head rest, comprising:
    a tubular stay including a horizontal portion and a pair of vertical leg portions each being formed integrally with and extending downwardly from respective ends of said stay;
    a friction member of a substantially U-shaped configuration in section, which receives therein said horizontal portion of said stay;
    an embracing support member of a rigid material which embraces and supports therein said friction member with said horizontal portion of said stay therein;
    a head rest frame integrally formed with said embracing support member; and
    said embracing support member being secured together with said friction member to a rear surface of said head rest frame,
    wherein said head rest frame and embracing support member are formed of a metallic plate, and wherein said embracing support member is bent in a substantially U-shaped configuration, extending from lower end of said head rest frame, so as to receive said friction member therein,
    whereby said head rest is rotatable about said horizontal portion of said stay and its position is adjustable in a forward and a backward direction with respect to said stay by virtue of friction resistance of said friction member.

2. The fore-and-aft adjusting device according to claim 1, wherein said friction member is formed with a cut-away portion and there is provided a stopper on said horizontal portion of said stay such that said stopper is disposed at a point corresponding to said cut-away portion, to thereby provide a limit against the forward and backward rotation range of said head rest and also prevent lateral movement of said head rest relative to said stay.

3. The fore-and-aft adjusting device according to claim 1, wherein said embracing support member and said friction member are secured by means of a securing member to said head rest frame, and wherein said embracing support member comprises bolt and nut.

4. A fore-and-aft adjusting device for a head rest, comprising:
- a tubular stay including a horizontal portion and a pair of vertical leg portions each being formed integrally with and extending downwardly from respective ends of said stay;
- a reinforcing rod extended between lower parts of said vertical leg portions of said stay in parallel with said horizontal portion of said stay;
- a friction member of a substantially U-shaped configuration in section, which receives therein said reinforcing rod;
- an embracing support member of a rigid material which embraces and supports therein said friction member with said reinforcing rod therein;
- a head rest frame integrally formed with said embracing support member; and
- said embracing support member being secured together with said friction member to rear surface of said head rest frame,
- wherein said head rest frame is disposed forwardly of said stay, so that said head rest, when rotated backwardly, is brought to abutment against said horizontal portion of said stay, to thereby limit backward rotation of the head rest frame,
- whereby said head rest is rotatable about said reinforcing rod and is adjustable its position in forward and backward direction with respect to said stay by virtue of friction resistance of said friction member.

5. The fore-and-aft adjusting device according to claim 4, wherein said friction member is formed with a cut-away portion and there is provided a stopper on said horizontal portion of said stay such that said stopper is disposed at a point corresponding to said cut-away portion, to thereby provide a limit against the forward and backward rotation range of said head rest.

6. The fore-and-aft adjusting device according to claim 4, wherein said embracing support member is formed independently of said head rest frame, wherein both said friction member and embracing support member are secured to said head rest frame by means of securing means, and wherein said securing means comprises at least one bolt and nut.

7. The fore-and-aft adjusting device according to claim 1, wherein said friction member is made of nylon or polyacetal.

8. The fore-and-aft adjusting device according to claim 4, wherein said friction member is made of nylon or polyacetal.

9. A fore-and-aft adjusting device for a head rest, comprising:
- a tubular stay including a horizontal portion and a pair of vertical leg portions each being formed integrally with and extending downwardly from respective ends of said stay;
- a friction member of a substantially U-shaped cross-section which receives therein said horizontal portion of said stay;
- a head rest frame;
- an embracing support member of a rigid material integrally formed with a bottom portion of said head rest frame so as to form a substantially U-shaped pocket which opens upwardly for embracing and supporting therein said friction member with said horizontal portion of said stay therein such that said friction member is pressingly interposed between said embracing support member and a rear surface of said head rest frame;
- means for securing said friction member to said embracing support member and to the rear surface of said head rest frame;
- whereby said head rest is rotatably about said horizontal portion of said stay and its position is adjustable in a forward and a backward direction with respect to said stay by virtue of frictional resistance of said friction member.

10. The fore-and-aft adjusting device according to claim 9, wherein said friction member is formed with a cutaway portion and a stopper is provided on said horizontal portion of said stay such that said stopper is disposed at a point corresponding to said cut-away portion to provide a limit against the forward and backward rotation range of said head rest and to prevent lateral movement of said head rest relative to said stay.

11. The fore-and-aft adjusting device according to claim 9 wherein said head rest frame and said embracing support member are formed of a metallic plate, and wherein said embracing support member is bent in a substantially U-shaped configuration, extending from a lower end of said head rest frame, so as to receive said friction member therein.

12. The fore-and-aft adjusting device according to claim 9, further comprising a securing member for securing said embracing support member and said friction member to said head rest frame, and wherein said embracing support member is formed independently of said head rest frame, and said securing member comprises at least one bolt and nut.

13. The fore-and-aft adjusting device according to claim 9; wherein said head rest frame is disposed forwardly of said stay, so that said head rest, when rotated backwardly, is brought to abut against said horizontal portion of said stay, to thereby limit backward rotation of the head rest frame.

14. The fore-and-aft adjusting device according to claim 9, wherein said friction member is made of nylon or polyacetal.

* * * * *